Patented Feb. 2, 1954

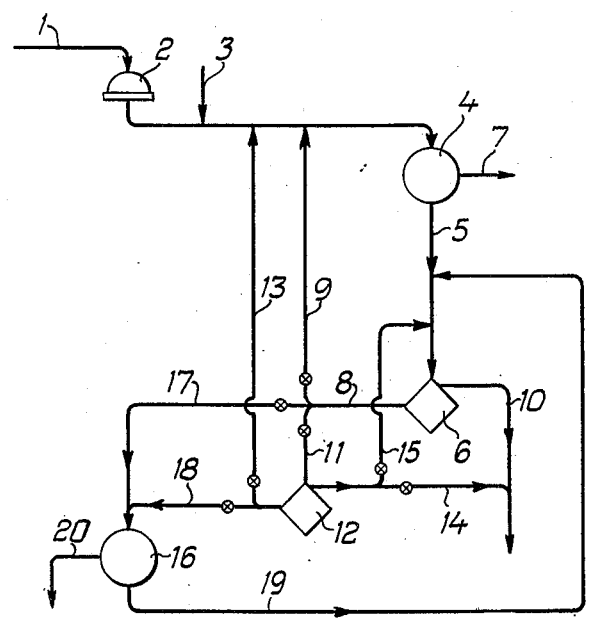

2,667,973

UNITED STATES PATENT OFFICE 2,667,973

PROCESS FOR RECOVERING PROTEIN FROM PROTEIN-BEARING MATERIAL

Hans Olof Lindgren, Smedslatten, Sweden, assignor, by direct and mesne assignments, of one-half to Aktiebolaget Separator, Stockholm, Sweden, a corporation of Sweden, and one-half to Imperial Chemical Industries, Limited, London, England, a corporation of Great Britain Application January 18, 1949, Serial No. 71,486

4 Claims. (Cl. 210—63)

This invention relates to the recovery of protein from protein-bearing material, and more particularly to an improved process for this purpose.

Several fruits, such as soy-beans and peanuts, are used as raw material for the recovery of protein in pure or substantially pure state. The procedure is then generally as follows:

The raw material is freed from other components, such as oil, fats, starch and the like, if such substances are present and their recovery is desired. The material is then treated (generally in connection with a fine grinding operation) with alkali or an acid for giving it a pH-value such that the most economical dissolution optimum of the protein is obtained. However, this regulation of the pH-value does not necessarily result in the greatest possible amount of the protein in the raw material being dissolved, although it may be sufficient to dissolve the main portion of the protein substances which are desired to be recovered. In many cases the protein substances have different solubilities at the same pH-value. The liquid with the dissolved protein substances also contains quantities of undissolved substances, mainly undissolved proteins and fibres, and also other substances, such as starch and sand. The liquid is then submitted to a first purification by filtering. Generally, it is not possible to use in this initial filtration a filter cloth so fine that the liquid is obtained in a sufficiently pure state. Eventually, however, there is built upon the filter cloth a filtering medium consisting of impurities contained in the liquid, and in this way the finest impurities are also removed to a certain extent in the filter.

The present invention has for its principal object the provision of a process for the recovery of protein from protein-bearing material, by which the finest impurities are much more completely removed than by the methods heretofore used.

In the practice of the invention, the protein-bearing material is first filtered, and the liquid from the filtration is then fed to a centrifugal separation plant, from which the sludge is discharged continuously or periodically through sludge discharge openings arranged at the periphery of the centrifugal separator bowls used for the separation. Some of this sludge is fed back to the filtering cloths to form a filtering medium on the cloths. The sludge concentrate thus returned to the filtering cloths consists mainly of finely divided solid impurities, in addition to liquid. By such a recirculation, there is a somewhat increased percentage of the finely divided impurities fed to the centrifugal separator and then discharged in the concentrate. However, because of the increased ability of the filter to separate these fine impurities, a state of equilibrium is obtained, the same quantity of finely divided impurities being discharged from the system as is introduced into it. By the practice of the new method, it is possible to remove the finely divided fibres with the least possible loss of liquid.

The centrifugal separation is preferably carried out in two stages. The sludge concentrate from the centrifugal separator of the first stage is again separated in a second centrifugal separator, and the sludge from the latter separator is fed back to the filter. The liquid separated in the second centrifugation may be mixed with the liquid discharged from the first centrifuge, if it is as pure as this liquid. The second centrifugal separation can, however, be effected in such a way that the separated liquid from the second centrifuge is less pure than that from the first centrifuge, and in that case it is preferably returned to the inlet of the first centrifugal separator. In this way, it is possible to have a higher throughput rate in the second stage separation, and the centrifuge there used may be of a correspondingly smaller size.

It is also possible to use a separate filter for the sludge concentrate separated out by the centrifugal separation, whether the separation is carried out in one or in two stages. The impurities separated by this filter are discharged from the process, while the liquid obtained in the filtering is mixed with the liquid from the other filter.

For a better understanding of the invention, reference may be had to the accompanying drawing illustrating schematically a plant for carrying out the process.

Referring to the drawing, the numeral 1 designates a pipe through which the residue, the so-called press cake residue (obtained after the pressing and/or the extraction of oil from the raw material and containing mainly fibres and protein substances) is fed to a mill 2 for grinding. Through a pipe 3 there is added to the ground material a solvent, for instance, a soda-containing liquid, for obtaining the desired pH-value, whereby more or less of the protein substances are dissolved. The liquid is then fed through a filtering zone, formed by a filter 4, in order to remove coarse undissolved substances. Since the liquid contains fine fibres which have a clogging effect on the filtering medium, the filter 4 cannot be made of textile cloth or the like, but it is made of metal wire cloth, generally with 80–100 meshes per inch. Accordingly, some fine fibres are not removed by the filter 4 but are discharged through the pipe 5 together with the filtered liquid, which is then submitted to centrifugal separation in a centrifugal separator 6. The sludge retained on the filter 4 is discharged through an outlet 7.

In the centrifugal separator 6, the fine sludge is separated out as a sludge concentrate, which is fed through the pipes 8 and 9 and returned to and mixed with the liquid fed to the filter apparatus 4. The clarified liquid is discharged from the centrifuge 6 through a pipe 10.

The sludge concentrate from the separator 6 may, if desired, be fed to a second stage separator 12 through the pipe 8 and a pipe 11. From the latter separator, the sludge concentrate may be fed through a pipe 13 and returned to and mixed with the liquid fed to the filter apparatus 4. The liquid component from the separator 12 is delivered through a pipe 14 and mixed with the liquid discharged from the separator 6 of the first stage, if it is of the same purity grade. Otherwise, it is returned to the feed side of the separator 6 through a pipe 15.

The sludge concentrate removed by the centrifugal separation may, instead of being returned to the filter apparatus 4, be treated in a separate filtering zone formed by a filter 16. In this case it is fed to the filter 16 through a pipe 17 or a pipe 18. The filtered liquid from the filter 16 is then fed through a pipe 19 and returned to and mixed with the filtered liquid passing from the filter 4 through the pipe 5. The sludge removed in the filter 16 is discharged through an outlet 20.

I claim:

1. In the recovery of protein from protein-bearing material having some of the protein dissolved in a liquid at a certain pH-value, the process which comprises feeding the solution through a filtering zone to remove from the solution the main part of the undissolved substances therein, centrifuging the filtrate from said zone to separate a sludge concentrate therefrom, filtering said sludge concentrate in a separate filtering zone, and mixing the filtered liquid from said last zone with the liquid passing from the first filtering zone and fed to the centrifuging step, while separately discharging from the second filtering zone the impurities separated therein.

2. In the recovery of protein from protein-bearing material having some of the protein dissolved in a liquid at a certain pH value, the process which comprises feeding the solution through a filtering zone to remove from the solution the main part of the undissolved substances therein, centrifuging the filtrate from said zone to separate a sludge concentrate of fine particles therefrom, and increasing the concentration of fine particles in the solution fed to the filtering zone by returning at least part of said sludge concentrate to the filtering zone in admixture with the solution being fed to the filtering zone, said centrifuging being effected in two stages wherein the sludge concentrate separated from the liquid component in the first stage is fed to the second stage centrifugation, the sludge concentrate separated from the liquid component in the second stage being returned to and mixed with the solution fed to the filtering zone.

3. A process according to claim 2, comprising also the step of intermixing the separated liquid components from said two stages.

4. A process according to claim 2, in which the liquid component separated in said second stage is mixed with the liquid passing from the filtering zone and fed to the first centrifugation stage.

HANS OLOF LINDGREN.

References Cited in the file of this patent

UNITED STATES PATENTS

| Number | Name | Date |
|---|---|---|
| 1,264,635 | Graham | Apr. 30, 1918 |
| 1,617,014 | Derleth | Feb. 8, 1927 |
| 2,215,624 | Strezynski | Sept. 24, 1940 |
| 2,316,807 | Peltzer | Apr. 20, 1943 |
| 2,467,402 | Pascal | Apr. 19, 1949 |
| 2,479,481 | Eberl et al. | Aug. 17, 1949 |